United States Patent

[11] 3,626,311

[72] Inventor Albert V. Kraybill
Riverside, Ill.

[21] Appl. No. 59,530
[22] Filed July 30, 1970
[45] Patented Dec. 7, 1971
[73] Assignee Motorola, Inc.
Franklin Park, Ill.

[54] PHASE LOCK LOOP DEMODULATOR PROVIDING NOISE SUPPRESSION
7 Claims, 4 Drawing Figs.

[52] U.S. Cl. .......... 329/122, 307/320, 325/346, 325/419, 329/50, 331/23, 331/36 C
[51] Int. Cl. .......... H03d 3/18, H03d 3/24
[50] Field of Search .......... 329/122, 50; 331/18, 23, 25; 328/133; 325/346, 419; 178/5.4 SD

[56] References Cited

UNITED STATES PATENTS

| | | | |
|---|---|---|---|
| 3,111,625 | 11/1963 | Crafts | 329/122 X |
| 3,181,122 | 4/1965 | Brown | 331/18 X |
| 3,209,271 | 9/1965 | Smith | 331/25 X |
| 3,287,657 | 11/1966 | Widl | 331/25 X |

*Primary Examiner*—Alfred L. Brody
*Attorney*—Mueller and Aichelle

ABSTRACT: A synchronous tone demodulator is comprised of a phase detector, a band-pass filter at the frequency of the desired tone and a low pass filter connected with a voltage-controlled oscillator in a feedback loop from the output of the phase detector to one of two inputs thereof. A carrier wave which is frequency or phase modulated by the tone is applied to the other input of the phase detector. Because the bandwidth of the feedback loop is limited by the filters, noise signals of frequencies outside of the band-pass of the filters are attenuated, thereby allowing the loop to lock even though the signal-to-noise ratio of the modulated wave is low. The desired tone signal derived by the phase detector appears at the output of the band-pass filter.

PATENTED DEC 7 1971 3,626,311

INVENTOR
ALBERT V. KRAYBILL

BY

Mueller & Aichele

ATTYS.

PHASE LOCK LOOP DEMODULATOR PROVIDING NOISE SUPPRESSION

BACKGROUND OF THE INVENTION

Radio receivers having high sensitivity are often required in specialized communication systems so that radio communication can be accomplished with limited amounts of power being expended in generating the transmitted wave. For instance, radiopaging systems sometimes employ a plurality of receivers or pagers, each of which is carried by a person to whom it is desired to convey information. Each of these receivers is capable of demodulating at least one electrical tone having a preselected frequency which may be frequency or phase modulated onto a carrier wave. The demodulated tone is used to alert the person carrying the pager so that he will perform some act, e.g., telephone a predetermined place for instructions. Since the location of this person, and hence the location of the pager, may vary anywhere from immediately adjacent the antenna of the transmitter for the paging system to inside a building several blocks from the transmitter, the pager receiver must be able to demodulate the selected tone or tones, from transmitted signals having different field strengths and different signal-to-noise ratios.

Demodulation of frequency-modulated (FM) signals generally becomes correspondingly more difficult as the signal-to-noise ratio decreases, until a particular signal-to-noise cutoff ratio is reached whereat any given receiver can no longer recover or separate the desired signal from the noise. In the past, many techniques have been developed to lower this cutoff ratio to thereby increase the effective range of receivers. Conventional FM broadcast receivers, for instance, often include limiter circuitry which clips the amplitude of an intermediate frequency signal at a predetermined value to remove amplitude modulation caused by noise, thereby decreasing the effect of the noise at high signal-to-noise ratios.

Under normal limiter-operating conditions, the desired signal determines when the limiter, switches in and out of saturation. However, if two signals having different amplitude levels are applied to the limiter, the signal having the greater amplitude "captures" the limiter or controls the points in time when the limiter switches in and out of saturation thereby keeping the signal of less amplitude from interfering therewith. This capture phenomena is usually advantageous in conventional FM systems because it enables a receiver to demodulate only the stronger of two broadcasted signals, or to demodulate the desired signal which usually has a greater amplitude than noise occurring therewith within the geographical area served by a commercial broadcast. However, in some communication applications, such as the foregoing paging system, where the strength of the noise may approach or even exceed the strength of the desired signal, capture can be detrimental because it allows the noise to control the limiter thereby causing the desired information signal to be lost.

To facilitate demodulation under low signal-to-noise conditions, linear detectors have been developed for use with receivers. These detectors do not include limiter stages but provide an output signal which is essentially a linear function of the input signal. A phase lock loop detector is one type of linear detector employed in military and aerospace communication applications. Conventional phase lock loop systems are capable of demodulating information signals under noise conditions which would render the aforementioned broadcast receiver, having a limiter-demodulator, inoperative.

SUMMARY OF THE INVENTION

It is an object of the invention to provide an improved, inexpensive and compact tone-demodulating circuit.

Another object of the invention is to provide a synchronous tone demodulator which is suitable for demodulating, under low signal-to-noise conditions, and electrical tone having a single frequency and which frequency or phase modulates a carrier wave.

Still another object of the invention is to provide a synchronous tone demodulator which is suitable for demodulating, under low signal-to-noise conditions, a plurality of electrical tones of predetermined frequencies occurring either simultaneously or individually and which frequency or phase modulates carrier wave. In brief, one embodiment of the invention relates to a demodulator having a phase lock loop including a phase detector and a voltage-controlled oscillator (VCO) for demodulating at least one tone which is frequency modulated onto a carrier wave. The phase detector has a first input connected to receive the frequency-modulated signal and a second input connected to the output of the VCO. The output of the phase detector is connected through the parallel combination of a low pass filter and a band-pass filter, or filters, to the output terminal of the demodulator and to the frequency control element of the VCO, thereby completing a feedback loop from the output of the phase detector to the second input of the phase detector. The low pass filter passes a control signal which enables the VCO to track the average frequency of the carrier. The band-pass filter, or filters, passes selected tone frequency or frequencies to be demodulated. The composite band-pass of the band and low pass filters is restricted as compared to the band-pass of prior art phase lock loops, thereby improving the signal-to-noise ratio of the demodulated tone or tones, and enabling the loop to lock under noise conditions which would otherwise disable the demodulator.

DESCRIPTION OF THE PREFERRED EMBODIMENT

Figure 1:
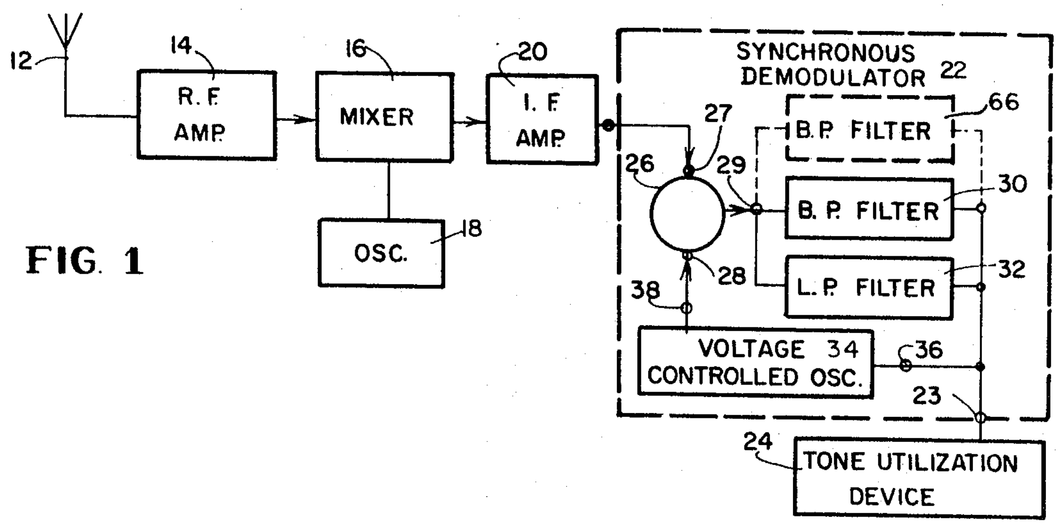
FIG. 1 is a block diagram of a receiver including a tone demodulator of one embodiment of the invention.

FIG. 1 illustrates a receiver 10 which demodulates a tone, or tones, of predetermined frequency, or frequencies, and applies the same to a tone utilization device. The demodulated tone could alert a person carrying the receiver that he is to make a phone call to a previously designated station, or the tones might form a control signal for initiating operation of remote-controlled equipment.

Receiver 10 may be required to operate under a variety of signal-to-noise ratios. For instance, the signal strength might be decreased because of an increase in distance between antenna 12 of the receiver and the antenna of the transmitter sending the signal thereto. Also the signal-to-noise ratio might be decreased because of an increase in noise caused by noise sources either external or internal to receiver 10.

Such external noises may be derived from impulse noise sources such as ignition in automobile engines, sparking of motors, switching of heavy current circuits on and off, or lightning. Such noises can completely obliterate desired signals that might otherwise be recoverable. Internal noise sources are usually classified in three categories; i.e., thermal noise, diode noise and LF noise. Thermal noise results from the random motion of charge carriers in the conductors or resistors included in RF amplifier 14, for example. Diode noise results from randomly injected carriers or emitted electrons in transistors or vacuum tubes which could also be included in RF amplifier 14. These random carrier motions produce a small net current in one direction at one instant in time and in another direction during the next instant. The thermal and diode noise signals caused by such current fluctuations have uniform and continuous frequency spectrums. LF noise results from flickering in vacuum tubes or surface leakage in semiconductor devices and has a frequency spectrum which is approximately inversely proportional to frequency. Regardless of the source of the noise interference, the resulting noise signal adds vectorially to the desired modulated signal and produces both amplitude and phase modulation thereof.

Antenna 12 of receiver 10 receives a carrier wave which is frequency or phase modulated by at least a single tone and which may be susceptible to drift. As previously explained, this tone-modulated carrier wave might also be phase and amplitude modulated by impulse noise derived from noise sources exterior to receiver 10. RF amplifier 14 increases the amplitude of the composite signal comprised of a carrier wave component, the desired tone frequency or frequencies and the noise component applied thereto, while undesirably contributing additional noise modulation to the amplified signal. Mixer 16 receives both the output signal from RF amplifier 14 and an appropriate mixing signal from oscillator 18. Mixer 16 translates the desired spectral components of the composite output signal from RF amplifier 12 to a desired intermediate frequency (IF) band, while adding still further noise components thereto. IF amplifier 20, which is connected to the output of mixer 16, selects a predetermined spectral portion of the output of mixer 16 which includes the desired signal while discriminating against the noise signal components having frequencies outside of its passband. The selected IF signal and noise components are amplified by IF amplifier 20 which also contributes additional noise components. Provided the signal-to-noise ratio is high enough, phase tracking or synchronous demodulator 22 recovers the desired tone or tones and applies the same to output 23. Tone utilization device 24, which is connected to output 23, receives the tone, or tones, from output 23. If receiver 10 is utilized in a pager, device 24 may include a tone amplifier whose output is coupled to an audio transducer such as a loudspeaker. Alternatively, if receiver 10 is associated with remotely controlled equipment, device 24 may include logic circuitry which responds to a plurality of tones of different predetermined frequencies sent either in sequence or simultaneously, or both.

Figure 2:
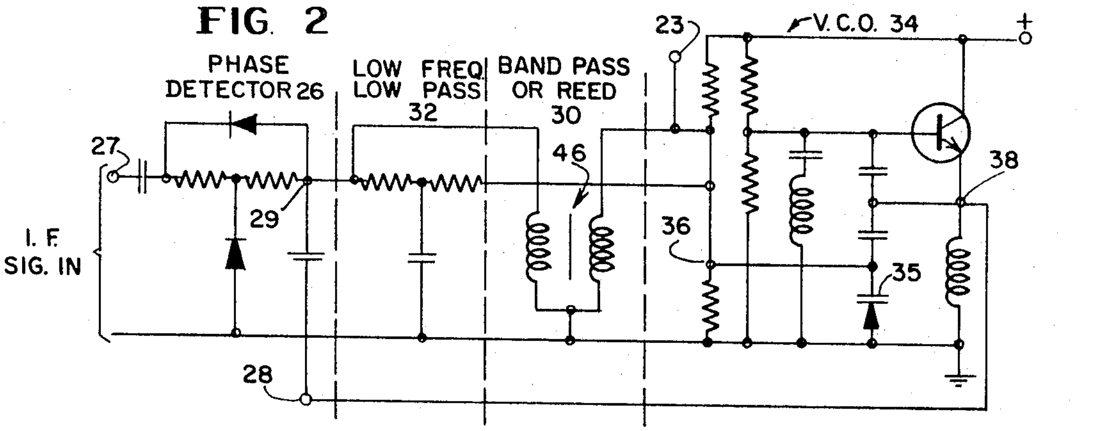
FIG. 2 is a schematic diagram of the synchronous demodulator of FIG. 1.

Synchronous demodulator 22, which is also shown in schematic form in FIG. 2, includes a phase detector 26 having a first input 27 coupled to the output of the IF amplifier 20, a second input 28 and an output 29. Band-pass filter 30 and low pass filter 32 are connected in parallel between output 29 of phase detector 26 and output terminal 23 of the synchronous demodulator. The frequency-controlling element of voltage-controlled oscillator (VCO) 34 is coupled to terminal 36 to which the output of filters 30 and 32 are connected. The output terminal 38 of VCO 34 is connected to input terminal 28 of phase detector 26. The amplitude and polarity of a varying direct current DC control signal applied to the frequency-controlling element of VCO 34, which is varactor diode 35, controls the frequency of the alternating current AC signal developed at output 38 of the VCO. If the amplitude of the control signal is zero, the oscillating frequency of the VCO is equal to the center frequency of the IF applied at terminal 27.

In operation, phase detector 26 of FIG. 2 provides a signal at its output 29 having an amplitude and polarity which is a function of the difference in phase between the AC signals at its inputs 27 and 28. For instance, if the phase of the signal applied at input 27 leads the phase of the signal applied to input 28 by 30°, phase detector 26 might provide an output signal having a negative polarity and an amplitude of 1 volt. If the phase of the signal at input 27 lags the phase of the signal at input 28 by 60° phase detector 26 might provide an output signal having a positive polarity and an amplitude of 2 volts. If the phase difference between the signals at inputs 27 and 28 exceeds 90°, the amplitude of the phase detector output voltage will no longer be responsive to additional increases in phase difference. After being filtered by loop filters 30 and 32, the output or control signal of phase detector 26 is applied to the frequency control element or varactor 35 of VCO 34. The polarity of the control signal tends to change the frequency of the VCO in the proper direction, so as to bring the AC voltage at output 38 thereof into phase synchronism with the signal applied to input 27. However, if the signal at input 27 is frequency modulated, because of the time delay around the feedback loop, the phase of the output signal of the VCO lags the phase of the signal at input 27. The detection of this difference in phase provides an error signal which is also the demodulated signal at output 29.

Figure 3:
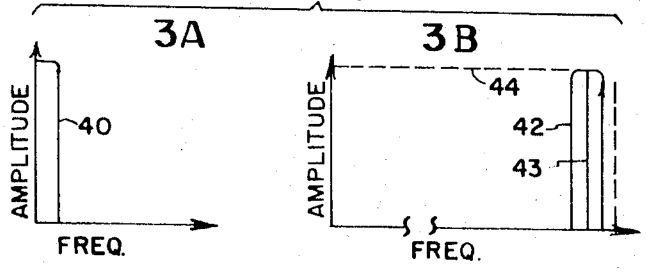
FIG. 3 illustrates the band-pass characteristic curves of the band and low pass filters of FIGS. 1 and 2.

The average IF of the signal applied to input 27 of phase detector 26 may slowly change because of carrier frequency drift. Low pass filter 32 provides a first control signal which enables the frequency of the output signal of VCO 34 to track this change. Therefore, low pass filter 32 must have a wide enough band-pass 40 (FIG. 3A) to effectively pass the rate of change of IF frequency or carrier drift. Otherwise, the phase difference between the output of VCO 34 and input signal at point 27 may exceed 90° causing the phase lock loop to lose "lock" thereby destroying its demodulating ability. Filter 32, which may be an active filter of the type shown in FIG. 4, typically has a passband extending from 0 to 1 Hz. which is sufficient to track the rate of carrier drift of a modern transmitter.

If the signal applied to point 27 of phase detector 26 is frequency or phase modulated by a single tone of proper frequency, band-pass filter 30 passes the demodulated tone, developed at detector output 29. Bnd-pass filter 30 has a selected passband 42 (FIG. 3B) centered about the frequency 43 of the demodulated tone. If, Band-pass example, the tone has a frequency of 300 Hz. the passband of filter 30 may extend from 290 to 310 Hz. After passing through filter 30, the tone is applied to the frequency-controlling element 35 of VCO 34 to vary the frequency of the signal at output 38 to thereby maintain phase lock with the input signal and cause an error signal at the output of detector 26 the amplitude of which varies instantaneous changes in frequency or phase of the modulated signal. Hence, the phase lock loop thereby demodulates the desired tone. Filter 30 may also be an active filter, of the type shown in FIG. 4, or a reed filter 46 including a mechanically vibratory resonant element having a mechanical resonant frequency substantially equal to the frequency of the tone to be demodulated.

In order for frequency control element 35 of VCO 34 to respond, the power of the desired signal components to be demodulated must have at least some particular ratio to the power of the unwanted, demodulated noise component, also developed at the output of detector 26. The noise power component is a function of both the bandwidth of the feedback loop and the signal-to-noise ratio of the IF signal applied to input 27 of phase detector 26.

Prior art phase lock loop demodulator, for demodulating a single frequency tone, often include a single wide band loop filter in place of the combination of band-pass filter 30 and low pass filter 32. Such wide band filters have a passband 44 (shown by dashed curve of FIG. 3B) extending from 0 Hz. up to a frequency which is greater than the frequency of the tone to be demodulated. The prior art circuits also sometimes include another filter having a passband centered about the tone to be demodulated which is connected outside of the loop between the output of the demodulator and the tone utilization device. If the signal-to-noise ration in the loop is high enough to provide a control signal capable of locking the loop, this filter discriminates against noise components outside of its passband thereby improving the signal-to-noise ratio of the signal developed at its output.

Noise power is proportional to loop bandwidth. Thus, if the prior art circuit is used to demodulate a 300-Hz. tone, the noise power is proportional to a bandwidth of about 310 Hz. On the other hand, if demodulator 22 is utilized to demodulate the 300-Hz. tone, band-pass filter 30 would have a passband 42 of 20 Hz., i.e., extending from 290 to 310 Hz., and low pass filter 32 would have a bandwidth of 1 cycle, i.e., extending for 0 to 1 Hz. Hence, the total passband demodulator 22 would be on the order of 21 Hz. Since the 21-Hz. loop bandwidth of demodulator 22 is less than the 310-Hz. bandwidth of prior art phase lock loop demodulators, the noise power resulting in the phase lock loop of demodulator 22 from a given wide spectrum noise signal applied thereto is less than the noise power resulting in the prior art feedback loops. Therefore, the signal-to-noise ratio of the feedback signal of detector 22 is increased with respect to that of prior art phase lock loops thereby enabling the loop of detector 22 to lock on signals having signal-to-noise ratios which could not be locked onto the prior art demodulators. Furthermore, detector 22 provides a demodulated tone which has a greater signal-to-noise ratio than tones provided at the outputs of the prior art tone demodulators.

Figure 4:
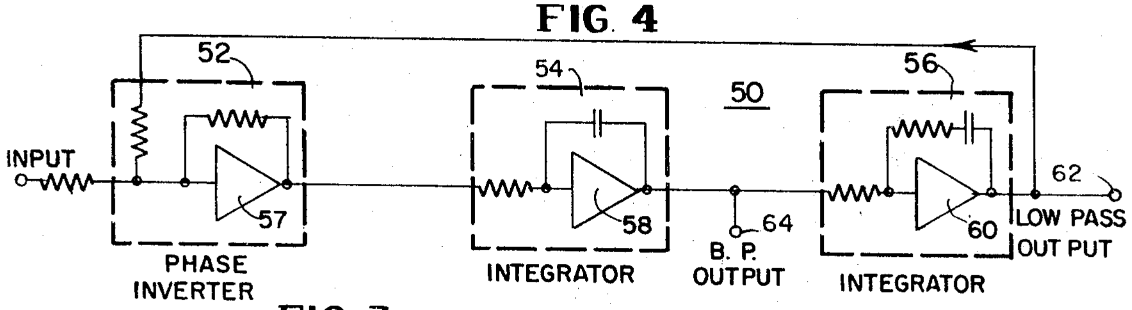
FIG. 4 illustrates an active filter which may be utilized in place of either or both of the band and low pass filters of FIG. 2.

Referring to FIG. 4, an active filter 50 is disclosed which is suitable for use as band-pass filter 30 or as low pass filter 32 of FIG. 1. Active filter 50 is comprised of the series connection of a phase inverter 52, a first integrator 54, and a second integrator 56, which respectively include operational amplifiers 57, 58 and 60. The output of second integrator 56 is fed back to a first input of phase inverter 52. A second input of phase inverter 52 is connected to output 29 of phase detector 26. Whether active filter 50 operates as a band-pass filter or a low pass filter depends on the point at which the output is taken, e.g. a low pass output results at point 62 and a band-pass output results at point 64. One of outputs 62 or 64 of active filter 50 is coupled to the output 23 of synchronous demodulator 10 and to the input 36 of VCO 34. The active filter 50 has less insertion loss; and, if provided in integrated circuit form, takes up less space than its counterpart shown in schematic form in FIG. 2.

As previously indicated, it is sometimes desired to demodulate a plurality of tones, each having a different predetermined frequency. Such tones may be sent either simultaneously or individually in a sequential manner; and they may be utilized in control or selective calling applications. The synchronous detector illustrated by the block diagram of FIG. 1 is adapted to demodulate the plurality of tones by including an additional band-pass filter 66 (shown dotted in FIG. 1) for each tone, in parallel with band-pass filter 30. The pass bands of each of the additional filters are chosen to include one of the additional tones. These pass bands must be narrow so that the signal-to-noise improvement previously discussed is substantially maintained.

What has been described, therefore, is a unique phase lock loop demodulating system which is suitable for demodulating either a single or plurality of single frequency electrical tones from a frequency of phase-modulated carrier signal under low signal-to-noise conditions.

I claim:

1. A synchronous demodulator for demodulating at least one single frequency tone signal which frequency modulates a carrier wave, the frequency-modulated wave having an average frequency susceptible to drift and being further modulated by noise signals, such demodulator including in combination:

phase detector means having first and second input terminals and an output terminal, said first input terminal being connected to receive the frequency-modulated wave;

band-pass filter means connected between said output terminal of said phase detector means and a demodulator output terminal and having a first narrow passband which includes the frequency of the tone signal to be demodulated;

low pass filter means connected in parallel with said band-pass filter means and having a second narrow passband which includes a frequency equal to the rate of change of the average frequency of the frequency-modulated wave;

voltage-controlled oscillator means developing a tracking signal having a center frequency substantially equal to the average frequency of the frequency-modulated wave, and having a tracking frequency control element and an output terminal, said output terminal of said voltage-controlled oscillator means being coupled to said second input terminal of said phase detector means thereby applying said tracking signal thereto; and means coupling the outputs of said band-pass filter means and said low pass filter means to said tracking frequency control element of said voltage-controlled oscillator means for controlling the frequency of the tracking signal;

said phase detector means developing a control signal having an amplitude and polarity which varies with the average frequency of the frequency-modulated wave, said low pass filter passing said control signal to said frequency control element so that said tracking signal produced by said voltage-controlled oscillator tracks the average frequency of said frequency-modulated wave, said phase detector means being responsive to said tracking signal and to the frequency-modulated wave to provide the tone and noise signals at the output thereof, said band-pass filter means passing the demodulated tone signal and rejecting the noise signals outside the passband thereof.

2. The demodulator of claim 1 wherein said tracking frequency control element of said voltage-controlled oscillator means is a varactor.

3. The demodulator of claim 1 wherein said band-pass filter means includes a mechanically vibratory resonant element which has a mechanical resonant frequency substantially equal to the frequency of the tone to be demodulated.

4. The demodulator of claim 1 wherein said band-pass filter means includes an active filter means which has a passband that includes the frequency of the tone to be demodulated.

5. The demodulator of claim 1 wherein said low pass filter means includes an active filter means.

6. The demodulator of claim 1 for demodulating a plurality of tone signals each having a different predetermined frequency and wherein said band-pass filter means includes a plurality of band-pass filters each of which having a narrow passband including one of the tones to be demodulated.

7. The demodulator of claim 6 wherein all of said band-pass filters are connected in parallel with each other.

* * * * *